(12) United States Patent
Hikmet et al.

(10) Patent No.: US 9,915,400 B2
(45) Date of Patent: Mar. 13, 2018

(54) MULTI-STAGED LIGHTING DEVICE

(71) Applicant: PHILIPS LIGHTING HOLDING B.V., Eindhoven (NL)

(72) Inventors: Rifat Ata Mustafa Hikmet, Eindhoven (NL); Ties Van Bommel, Horst (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 291 days.

(21) Appl. No.: 14/860,025

(22) Filed: Sep. 21, 2015

(65) Prior Publication Data

US 2016/0084452 A1 Mar. 24, 2016

(30) Foreign Application Priority Data

Sep. 22, 2014 (EP) .................................... 14185691

(51) Int. Cl.
| | |
|---|---|
| *F21K 99/00* | (2016.01) |
| *F21V 9/14* | (2006.01) |
| *F21V 9/16* | (2006.01) |
| *G03B 21/20* | (2006.01) |
| *G03B 33/06* | (2006.01) |
| *G03B 33/12* | (2006.01) |

(Continued)

(52) U.S. Cl.
CPC .................. *F21K 9/56* (2013.01); *F21K 9/64* (2016.08); *F21V 9/14* (2013.01); *F21V 9/16* (2013.01); *G03B 21/204* (2013.01); *G03B 21/2073* (2013.01); *G03B 33/06* (2013.01); *G03B 33/12* (2013.01); *F21Y 2115/10* (2016.08)

(58) Field of Classification Search
CPC ..... F21K 9/56; F21K 9/64; F21V 9/14; F21V 9/16; G03B 21/204; G03B 21/2073; G03B 33/06; G03B 33/12; F21Y 2115/10
USPC ............................................................ 362/19
See application file for complete search history.

(56) References Cited

U.S. PATENT DOCUMENTS 7,458,687 B2 12/2008 Silverstein et al.
8,833,944 B2 * 9/2014 Katou .................... G03B 21/14
                                                353/20

(Continued)

FOREIGN PATENT DOCUMENTS

WO 2009021079 A1 2/2009

*Primary Examiner* — Laura Tso

(57) ABSTRACT

A multi-staged lighting device (1) for generating a polarized multi-colored light beam (25) is disclosed. The multi-staged lighting device (1) comprises two or more light concentrators (5, 15), each light concentrator (5, 15) having a wavelength converter (8, 19) configured to convert light entering the light concentrator (5, 15) to light having a longer wavelength, and at least one polarizing beam splitter (10) configured to split converted light coupled out from a light concentrator (5, 15) into two light beams having different polarizations, one of the light beams being transmitted to a different light concentrator (5, 15) and the other light beam forming a color component of the polarized multi-colored light beam (25). Light converted by wavelength converters (8, 19) of different light concentrators (5, 15) has different wavelengths, and the light concentrators (5, 15) are arranged in order of increasing wavelength of the converted light, a first light concentrator (5) being arranged to receive light from at least one light source (2, 17). A method for generating a polarized multi-colored light beam (25) is also disclosed.

15 Claims, 3 Drawing Sheets

(51) Int. Cl.
  *F21K 9/64*      (2016.01)
  *F21Y 115/10*    (2016.01)

(56) References Cited

U.S. PATENT DOCUMENTS

| | | |
|---|---|---|
| 2005/0270775 A1 | 12/2005 | Harbers et al. |
| 2006/0221638 A1 | 10/2006 | Chew et al. |
| 2008/0094577 A1 | 4/2008 | Krijn et al. |
| 2008/0123056 A1 | 5/2008 | Matsubara |
| 2009/0002633 A1* | 1/2009 | Miyazawa ............. G03B 33/12 353/20 |
| 2012/0182484 A1 | 7/2012 | Imai et al. |
| 2013/0021582 A1* | 1/2013 | Fujita ................... G03B 21/204 353/31 |
| 2013/0215397 A1 | 8/2013 | Matsubara |
| 2014/0016098 A1* | 1/2014 | Matsumoto .......... G03B 21/204 353/20 |

* cited by examiner

MULTI-STAGED LIGHTING DEVICE

CROSS-REFERENCES TO RELATED APPLICATIONS

This patent application claims priority from European patent application 14185691.4, filed on Sep. 22, 2014, the entirety of which application is hereby incorporated by reference as if fully set forth herein.

TECHNICAL FIELD OF THE INVENTION

The present disclosure relates to a multi-staged lighting device for generating a polarized multi-colored light beam.

BACKGROUND OF THE INVENTION

Lighting devices which produce multi-colored light of a certain polarization are useful in many applications, for instance spotlights, stage lighting systems, automotive headlamps and digital light projectors. An example of such a light source is the device for projection displays disclosed in US 2008/0094577 A1. In this device, the light from several light emitting diodes is combined to form polarized light for producing a projected image.

Depending on the application, the lighting device must meet different technical requirements. Many applications require that the intensity of the produced light is high, and the development of high-intensity light sources producing polarized multi-colored light is therefore an important area of applied research.

SUMMARY OF THE INVENTION

It would be advantageous to provide an improved or alternative lighting device for producing polarized multi-color light. An aspect of particular interest is the capability of the lighting device to produce high-intensity light.

To better address this concern, in a first aspect of the invention a multi-staged lighting device for generating a polarized multi-colored light beam is provided, which multi-staged lighting device comprises two or more light concentrators and at least one polarizing beam splitter. Each light concentrator has a wavelength converter configured to convert light entering the light concentrator to light having a longer wavelength. The at least one polarizing beam splitter is configured to split converted light coupled out from a light concentrator into two light beams having different polarizations, one of the light beams being transmitted to a different light concentrator and the other light beam forming a color component of the polarized multi-colored light beam. The light converted by wavelength converters of different light concentrators has different wavelengths. The light concentrators are arranged in order of increasing wavelength of the converted light, the first light concentrator being configured to receive light from at least one light source.

By a "light concentrator" is meant a device adapted to collect and redistribute light in space so that the intensity of the light is increased. By a "color component of the polarized multi-colored light beam" is meant light forming part of the polarized multi-colored light beam and having a certain color.

The use of several light concentrators, each one contributing with a color component to the polarized multi-colored light beam, and the transmittal of light from one light concentrator to another, helps to increase the intensity of the polarized multi-colored light beam.

According to one embodiment of the multi-staged lighting device, the at least one light source is a solid state light source, such as a semiconductor light emitting diode, an organic light emitting diode, a polymer light emitting diode or a laser diode. Such light sources are energy efficient, relatively inexpensive and have a long lifetime. The at least one light source may for example be configured to emit blue light, violet light or ultraviolet light. By providing a wavelength converter with blue light, green light or red light can be produced. By providing a wavelength converter with violet or ultraviolet light, blue light or light having a longer wavelength than blue light can be produced.

According to one embodiment of the multi-staged lighting device, the two or more light concentrators are configured to receive light from at least one respective light source. Having each light concentrator receiving light from at least one light source helps to increase the intensity of the polarized multi-colored light beam. All of the light sources may be configured to emit light having the same color.

According to one embodiment of the multi-staged lighting device, the wavelength converter comprises a luminescent material. This class of materials includes many substances with different absorption and emission spectra, making it easier to select a wavelength converter that works well with a specific type of light source. The luminescent material may be a phosphor, such as an organic phosphor or an inorganic phosphor. The luminescent material may be yttrium aluminum garnet doped with a rare earth element and/or lutetium aluminum garnet doped with a rare earth element. The rare earth element may be cerium.

According to one embodiment of the multi-staged lighting device, the wavelength converter comprises several quantum dots. By a "quantum dot" is meant a nano-sized semiconductor crystal which, when excited by incident light, emits light of a color determined by the size and the material of the crystal. The narrow emission band and saturated color of the light emitted by quantum dots make these quantum dots particularly suitable for the present invention.

According to one embodiment of the multi-staged lighting device, the at least one polarizing beam splitter is a linear polarizing beam splitter. According to an alternative embodiment of the multi-staged lighting device, the at least one polarizing beam splitter is a circular polarizing beam splitter. Hence, the present invention works well with different types of polarizing beam splitters, allowing different application specific requirements to be met.

According to one embodiment of the multi-staged lighting device, it comprises at least one output optical element for transmitting light from a light concentrator to a polarizing beam splitter. The output optical element collects the light from a light concentrator and makes a parallel light beam for better functioning of the polarizing beam splitter.

According to one embodiment of the multi-staged lighting device, it comprises at least one input optical element for transmitting light from a polarizing beam splitter to a light concentrator. The input optical element collects the light from a polarizing beam splitter and focuses it on a light concentrator, thereby helping to reduce losses in the transmittal of light from one light concentrator to another light concentrator.

According to one embodiment, the at least one polarizing beam splitter is integrated with two consecutive light concentrators, whereby the input and output optical elements may be excluded. This may be advantageous for some applications.

According to a second aspect of the invention, there is presented a method for generating a polarized multi-colored light beam. The method comprises arranging two or more light concentrators in a sequence, each light concentrator having a wavelength converter configured to convert light inside the corresponding light concentrator to a longer wavelength, the light concentrators being arranged in order of increasing wavelength of the converted light. The method also comprises: receiving light at each light concentrator; converting light inside each light concentrator to light having a longer wavelength; and coupling out converted light from each light concentrator. For each pair of consecutive light concentrators, comprising an upstream light concentrator and a downstream light concentrator, the method comprises: splitting the converted light coupled out from the upstream light concentrator into two light beams having different polarizations; providing one of the light beams to the downstream light concentrator; and forming a color component of the polarized multi-colored light beam with another light beam.

The second aspect of the invention provides for technical effects which are identical or similar to those of the first aspect of the invention.

It is noted that the invention relates to all possible combinations of features recited in the claims.

BRIEF DESCRIPTION OF THE DRAWINGS

These and other aspects of the present invention will now be described in more detail, with reference to the appended drawings. Like reference numerals refer to like elements throughout.

DESCRIPTION OF EMBODIMENTS

Figure 1:
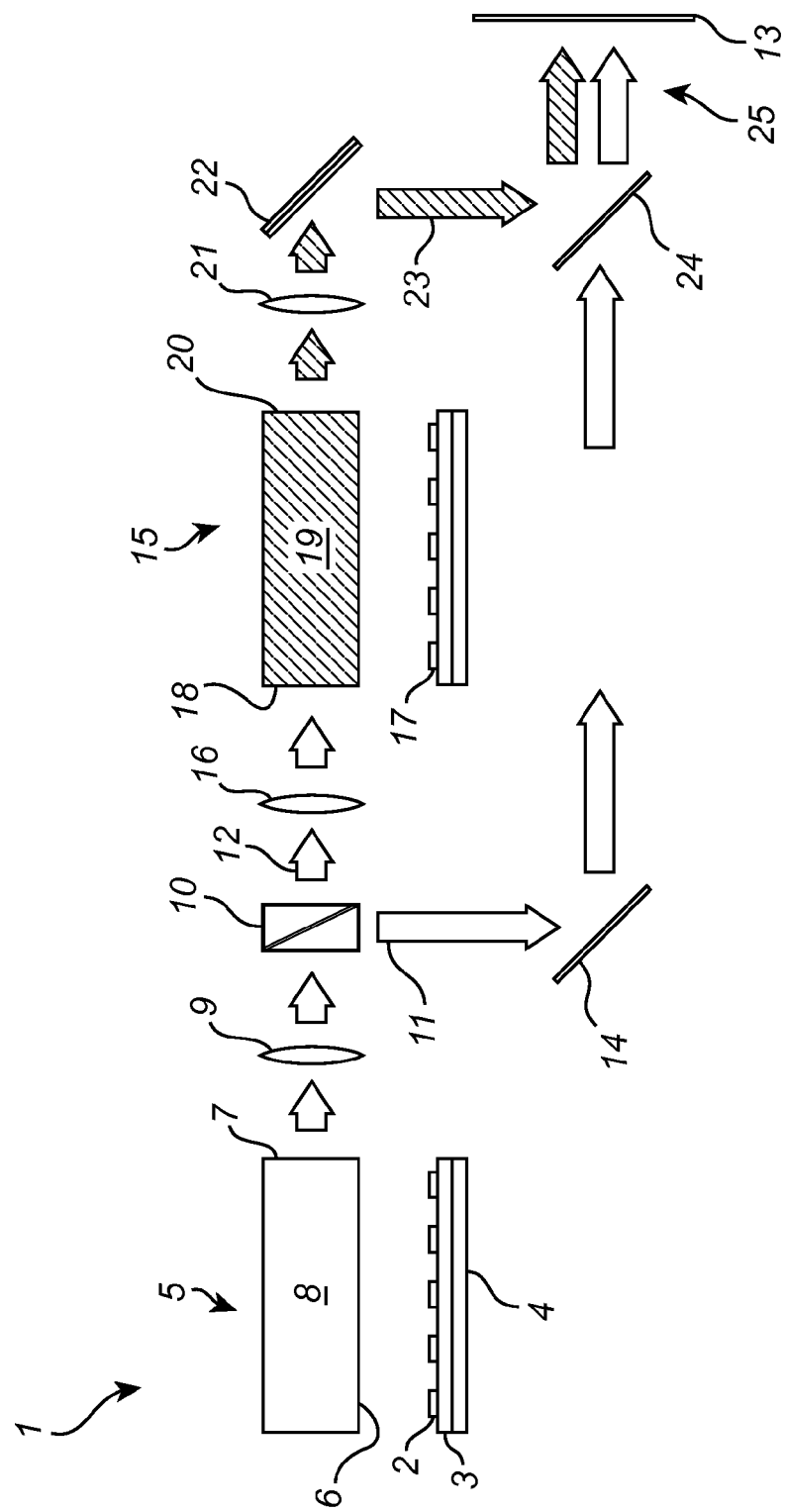
FIG. 1 shows a schematic side view of an embodiment of a multi-staged lighting device having two light concentrators.

Currently preferred embodiments of the present invention will now be described more fully hereinafter with reference to the accompanying drawings. This invention may, however, be embodied in many different forms and should not be construed as limited to the embodiments set forth herein; rather, these embodiments are provided for thoroughness and completeness, and fully convey the scope of the invention to the skilled person.

Light sources which are part of the embodiments according to the invention as set forth below, are adapted for, in operation, emitting light with a first spectral distribution. This light is subsequently coupled into a light guide or light concentrator. The light guide or light concentrator may convert the light of the first spectral distribution to another spectral distribution (another wavelength or wavelength range) and guides the light to an exit surface. The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these.

The light concentrators as set forth below in embodiments according to the invention generally may be rod shaped or bar shaped light concentrators comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light concentrators generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

The generally rod shaped or bar shaped light concentrator can have any cross sectional shape, but in embodiments has a cross section the shape of a square, rectangle, round, oval, triangle, pentagon, or hexagon. Generally the light concentrators are cuboid, but may be provided with a different shape than a cuboid, with the light input surface having somewhat the shape of a trapezoid. By doing so, the light flux may be even enhanced, which may be advantageous for some applications.

The light concentrators may also be cylindrically shaped rods. In embodiments the cylindrically shaped rods have one flattened surface along the longitudinal direction of the rod and at which the light sources may be positioned for efficient incoupling of light emitted by the light sources into the light concentrator. The flattened surface may also be used for placing heat sinks. The cylindrical light concentrator may also have two flattened surfaces, for example located opposite to each other or positioned perpendicular to each other. In embodiments the flattened surface extends along a part of the longitudinal direction of the cylindrical rod.

In embodiments as set forth below a coupling structure or a coupling medium may be provided for efficiently coupling the light emitted by the light source into the light concentrator or waveguide. The coupling structure may be a refractive structure having features, such as e.g. protrusions and recesses forming a wave shaped structure. The typical size of the features of the coupling structure is 5 μm to 500 μm. The shape of the features may be e.g. hemispherical (lenses), prismatic, sinusoidal or random (e.g. sand-blasted). By choosing the appropriate shape, the amount of light coupled into the light concentrator can be tuned. The refractive structures may be made by mechanical means such as by chiseling, sand blasting or the like. Alternatively, the refractive structures may be made by replication in an appropriate material, such as e.g. polymer or sol-gel material. Alternatively, the coupling structure may be a diffractive structure, where the typical size of the features of the diffractive coupling structure is 0.2 μm to 2 μm. The amount of diffracted light depends on the shape and height of the grating structures. By choosing the appropriate parameters, the amount of light coupled into the light concentrator can be tuned. Such diffractive structures most easily are made by replication from structures that have been made by e.g.

e-beam lithography or holography. The replication may be done by a method like soft nano-imprint lithography. The coupling medium may e.g. be air or another suitable material.

FIG. 1 schematically illustrates an embodiment of a multi-staged lighting device 1 which has a plurality of first light sources 2 in the form of solid state lighting devices. In a different embodiment, the multi-staged lighting device 1 has a single first light source 2.

The first light sources 2 are mounted on a carrier 3, for example a printed circuit board, which provides the necessary electrical circuitry for the first light sources 2. A heat sink 4 may be in thermal contact with the first light sources 2 so that excess heat generated during operation of the first light sources 2 can be removed efficiently. All of the first light sources 2 may be configured to emit light having the same color. For example, the light sources 2 may be configured to emit blue light, violet light or ultraviolet light. By "blue light" is here meant light having a wavelength in the range from about 450 nanometers to about 500 nanometers, by "violet light" is meant light having a wavelength in the range from about 380 nanometers to about 450 nanometers, and by "ultraviolet light" is meant light having a wavelength which is shorter than about 380 nanometers. The light emitted by the first light sources 2 usually comprises a, relatively small, range of wavelengths.

A first light concentrator 5 is configured to receive light from the first light sources 2. The first light concentrator 5 has an elongated shape. The first light concentrator 5 may for example have the shape of a straight tube. A cross section of the first light concentrator 5 can be circular or rectangular.

The first light concentrator 5 is adapted to operate as a waveguide, i.e. light is guided inside the first light concentrator 5 by total internal reflection. For this purpose, the light concentrator 5 may be provided with a transparent material having a high refractive index, such as a sapphire. The first light concentrator 5 has a light receiving surface 6 arranged to receive light emitted by the light sources 2 and a light output surface 7 through which guided light may exit. That is to say, light that is guided inside the first light concentrator 5 by total internal reflection may be coupled out of the first light concentrator 5 via the light output surface 7. The light output surface 7 is smaller than the light receiving surface 6, whereby the intensity of the light exiting the first light concentrator 5 is larger than the light entering the first light concentrator 5. The light receiving surface 6 is much larger than the light output surface 7. The area of the light receiving surface 6 can for example be at least ten times larger than the area of the light output surface 7, alternatively at least one hundred times larger. The first light concentrator 5 is typically thermally connected to a heat sink, either to the same heat sink 4 as the first light sources 2 or to a different one. Heat is for example generated by the wavelength conversion inside the first light concentrator 5.

The first light concentrator 5 comprises a first wavelength converter 8 configured to convert light entering the first light concentrator 5 to light having a longer wavelength than the light entering the first light concentrator 5. The first wavelength converter 8 may comprise a luminescent material, such as an organic phosphor or a transparent inorganic phosphor ceramic. The first wavelength converter 8 may comprise a mixture of luminescent materials.

Examples of transparent inorganic phosphor ceramics suitable for the present invention are yttrium aluminum garnet ($Y_3Al_5O_{12}$) doped with cerium (Ce) and lutetium aluminum granat ($Lu_3Al_5O_{12}$) doped with cerium. Further examples are the materials in the group comprising $(M{<}I{>}_{(1-x-y)}M{<}II{>}_xM{<}III{>}_y)_3(M{<}IV{>}_{(1-z)}M{<}V{>}_z)_5O_{12}$ where M<I> is selected from the group comprising Y, Lu or mixtures thereof, M<II> is selected from the group comprising Gd, Tb, La, Yb or mixtures thereof, M<III> is selected from the group comprising Tb (when M<II> is not Tb), Pr, Ce, Er, Nd, Eu or mixtures thereof, M<IV> is Al, M<V> is selected from the group comprising Ga, Sc or mixtures thereof, such as Ce doped Yttrium aluminum garnet (YAG, $Y_3Al_5O_{12}$) and Ce doped Lutetium-Aluminum-Garnet (LuAG); and $0{\leq}x{\leq}1$, $0{<}y{\leq}0.1$, $0{<}z{<}1$, $(M{<}I{>}_{(1-x-y)}M{<}II{>}_xM{<}III{>}_y)_2O_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0{<}x{\leq}1$, $0{<}y{\leq}0.1$, $(M{<}I{>}_{(1-x-y)}M{<}II{>}_xM{<}III{>}_y)S_{(1-z)}Se$ where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0{<}x{\leq}0.01$, $0{<}y{\leq}0.05$, $0{\leq}z{<}1$, $(M{<}I{>}_{(1-x-y)}M{<}II{>}_xM{<}III{>}_y)O$ where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0{<}x{\leq}0.1$, $0{<}y{\leq}0.1$, $(M{<}I{>}_{(2-x)}M{<}II{>}_xM{<}III{>}_2)O_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0{<}x{\leq}1$, $(M{<}I{>}_{(1-x)}M{<}II{>}_xM{<}III{>}_{(1-y)}M{<}IV{>}_y)O_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0{<}x{<}0.1$, $0{<}y{\leq}0.1$, or mixtures thereof.

Examples of organic phosphors suitable for the present invention are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170. A waveguide or light concentrator can be formed by arranging these materials in a transparent matrix such as poly methyl methacrylate.

The first wavelength converter 8 may comprise quantum dots in a transparent matrix. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content. A waveguide or light concentrator can be formed by arranging these materials in a transparent matrix such as poly methyl methacrylate.

An output optical element 9 is arranged to transmit most of the light that is coupled out from the light concentrator 5 via the light output surface 7 to a polarizing beam splitter 10. The output optical element 9 is optional and may or may not be included in a different embodiment. The output optical element 9 may be a refractive element, such as a lens. The output optical element 9 can be a compound parabolic concentrator. The polarizing beam splitter 10 is configured to split incoming light into two light beams having different polarizations, i.e. a first polarized light beam 11 and a second polarized light beam 12 which has a polarization different from the first polarized light beam 11. The polarizing beam splitter 10 may for example be a linear polarizing beam splitter so that the first and second polarized light beams 11, 12 are linearly polarized and have polarizations that are perpendicular to each other. For example, the first polarized light beam 11 can be p-polarized and the second polarized light beam 12 can be s-polarized, or vice versa, with respect to the plane of incidence. Alternatively, the polarizing beam splitter 10 may be a circular polarizing beam splitter so that one of the first and second polarized light beams 11, 12 is left-handed circularly polarized and the other is right-handed circularly polarized. Accordingly, the first and second polarized light beams 11, 12 have opposite polarizations. The polarizing beam splitters 11, 12 can for example be highly stable wire grid polarizers, thin film polarizers or cholesteric liquid crystal polarizers.

The first polarized light beam 11 is transmitted to a light exit window 13 of the multi-staged lighting device 1 via, for example, one or more mirrors 14, or any other type of element for redirecting light. The second polarized 12 light beam is transmitted to a second light concentrator 15 arranged in series with the first light concentrator 5. The first and second light concentrators 5, 15 thus form a pair of consecutive light concentrators, the first light concentrator 5 and the second light concentrator 15 being arranged upstream and downstream, respectively. In this embodiment, an input optical element 16 is arranged to transmit most of the second polarized light beam 12 to the second light concentrator 15. The input optical element 16 may for example be a refractive element, such as a lens. The input optical element 16 can be a compound parabolic concentrator. The input optical element 16 is optional and may or may not be included in a different embodiment. In this embodiment, the first and second light concentrators 5, 15, the input and output optical elements 16, 9, and the polarizing beam splitter 10 are arranged in a straight line, but this is not necessary. In other embodiments, the first and second light concentrators 5, 15, the input and output optical elements 16, 9, and the polarizing beam splitter 10 may be differently arranged in space by the use of various types of structures for redirecting light, such as for example mirrors or any other reflective or redirecting elements.

The second light concentrator 15 is generally similar to the first light concentrator 5. However, unlike the first concentrator 5, the second light concentrator 15 may in some embodiments not be configured to receive light from one or more light sources like the first light sources 2. In this embodiment, though, the second light concentrator 15 is configured to receive light from a plurality of second light sources 17. The second light sources 17 are solid state light sources. All of the second light sources 17 are typically configured to emit light having the same color, for example blue light, violet light or ultraviolet light. The light emitted by second light sources 17 may or may not have the same color as the light emitted by the first light sources 2.

The second light concentrator 15 has a light input surface 18 through which the second polarized light beam 12 may enter. The light input surface 18 may comprise a dichroic mirror which passes light having the color of the second polarized light beam 12 and blocks light having a different color so that such light striking the light input surface 18 inside the second light concentrator 15 is reflected back into the second light concentrator 15.

The second light concentrator 15 has a second wavelength converter 19 which is configured to convert light to a different wavelength than that of the light converted by the first wavelength converter 8. More precisely, light converted by the second wavelength converter 19 has a longer wavelength than light converted by the first wavelength converter 8. It follows that the first and second light concentrators 5, 15 are arranged in order of increasing wavelength of the light converted by their respective wavelength converter. The second wavelength converter 19 may be formed by one or more of the luminescent materials and/or types of quantum dots stated above in connection with the discussion of the first wavelength converter 5.

The second light concentrator 15 has a light output surface 20 through which light that is guided inside the second light concentrator 15 is coupled out from the second light concentrator 15. An output optical element 21 is arranged to transmit out-coupled light to a polarizer 22 which is configured to form a third polarized light beam 23 having the same polarization as the first polarized light beam 11. The output optical element 21 may for example be a refractive element, such as a lens. The output optical element 21 can be a compound parabolic concentrator. One or more mirrors 24, or any other type of elements for redirecting light, are arranged to direct the third polarized light beam 23 to the light exit window 13 of the multi-staged lighting device 1, whereby the first and third polarized light beams 11, 23 are combined so as to form a respective color component of a polarized multi-color light beam 25. In a different embodiment, the polarizer 22 may be arranged to receive not only light coupled out from the second light concentrator 15 but also the first polarized light beam 11 which, since it is already polarized, simply passes through the polarizer 22 before reaching the light exit window 13.

Figure 2:
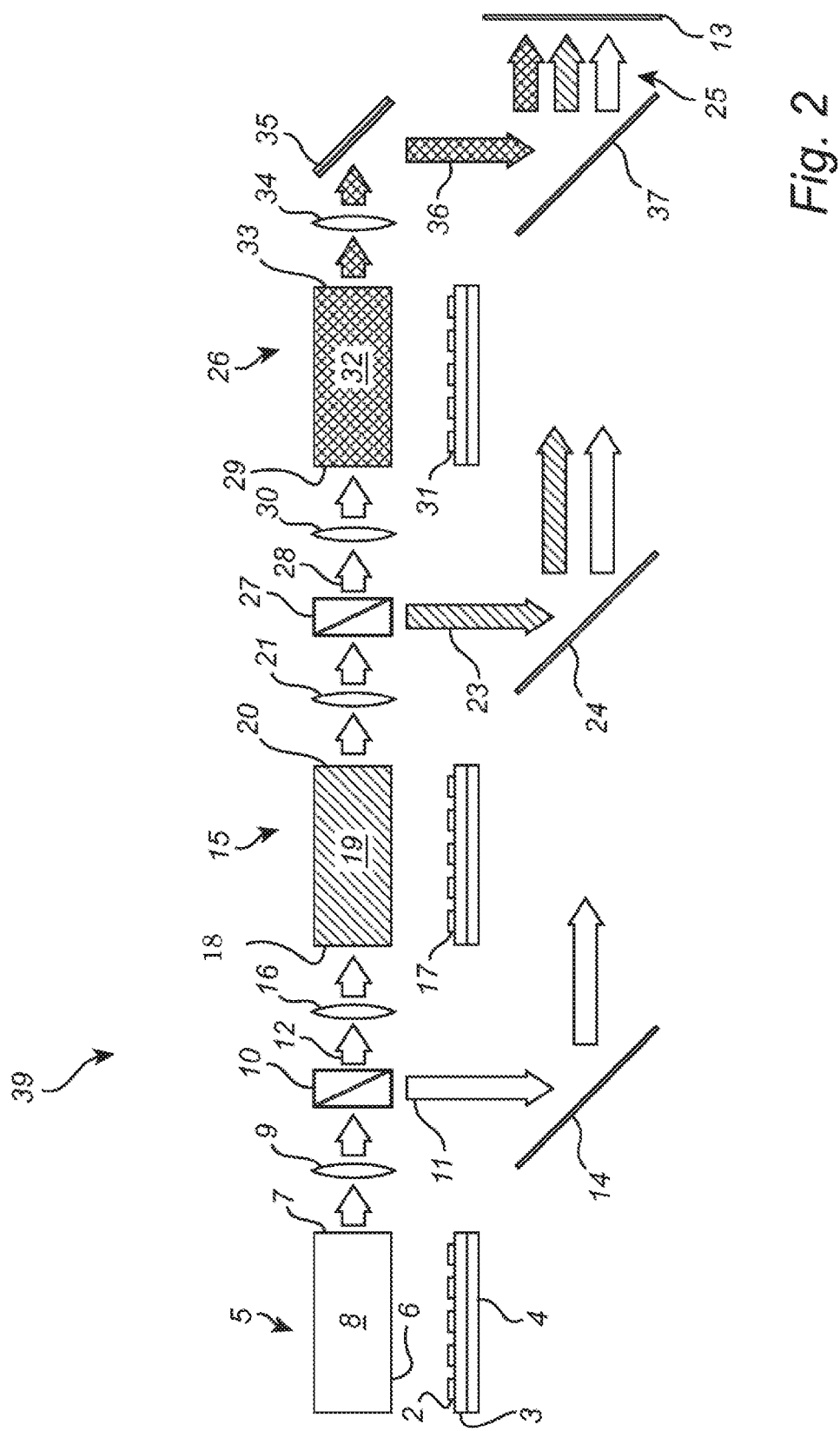
FIG. 2 shows a schematic side view of an embodiment of a multi-staged lighting device having three light concentrators.

FIG. 2 schematically illustrates an embodiment of a multi-staged lighting device 39 which has a first, a second and a third light concentrator 5, 15, 26 arranged, in this example, in a straight line or in series as three consecutive light concentrators. The first and second light concentrators 5, 15 are similar to the light concentrators described above with reference to FIG. 1 and also similarly operatively connected to each other as those light concentrators.

The third light concentrator 26 is similar to, and arranged in series with, the first and second light concentrators 5, 15. A polarizing beam splitter 27 is arranged to receive light coupled out from the second light concentrator 15 via an output optical element 21, for example a lens or other type of refractive element. The output optical element 21 can be a compound parabolic concentrator. The polarizing beam splitter 27 is configured to split incoming light into a third light beam 23 and a fourth light beam 28 having different polarizations. The third light beam 23 has the same polarization as the first polarized light beam 11, and the polarization of the fourth polarized light beam 28 is opposite that of the third polarized light beam 23. One or more mirrors 24, or any other type of element for redirecting light, are arranged to transmit the third polarized light beam 23 to the light exit window 13 of the multi-staged lighting device 39. A light input surface 29 of the third light concentrator 26 is arranged to receive the fourth light beam 28 via an input optical element 30, for example a lens or other type of refractive element. The input optical element 30 can be a compound parabolic concentrator.

The third light concentrator 26 is configured to receive light from a plurality of third light sources 31 in the form of solid state lighting devices. The third light sources 31 may be excluded in other embodiments. All of the third light sources 31 are typically configured to emit light having the same color, for example blue light, violet light or ultraviolet light. In this embodiment, the first, second and third light sources 2, 17, 31 are all configured to emit light having the same color. In other embodiments, this may not be the case.

The third light concentrator 26 has a third wavelength converter 32 which is configured to convert light to a different wavelength than both the first and the second wavelength converters 8, 19. More precisely, light converted by the third wavelength converter 32 has a longer wavelength than light converted by the first and second wavelength converters 8, 19. Hence, the first, second and third light concentrators 5, 15, 26 are arranged in order of increasing wavelength of the light converted by their respective wavelength converter. For example, light converted by the first, second and third wavelength converters 8, 19, 32 may be blue, green and red, respectively. The third wavelength converter 32 may be formed by one or more of the luminescent materials and/or types of quantum dots stated above in connection with the discussion of FIG. 1.

The third light concentrator 26 has a light output surface 33 through which light that is guided inside the third light concentrator 26 may be coupled out. An output optical element 34 is arranged to transmit out-coupled light to a polarizer 35 configured to form a fifth polarized light beam 36 having the same polarization as the first and third polarized light beams 11, 23. The output optical element 34 may for example be a refractive element, such as a lens. The output optical element 34 can be a compound parabolic concentrator. One or more mirrors 37, or any other type of elements for redirecting light, are arranged to transmit the fifth polarized light beam 36 to the light exit window 13 of the multi-staged lighting device 39, whereby the first, the third and fifth polarized light beams 11, 23, 36 are combined so as to form a respective color component of the polarized multi-color light beam 25.

Figure 3:
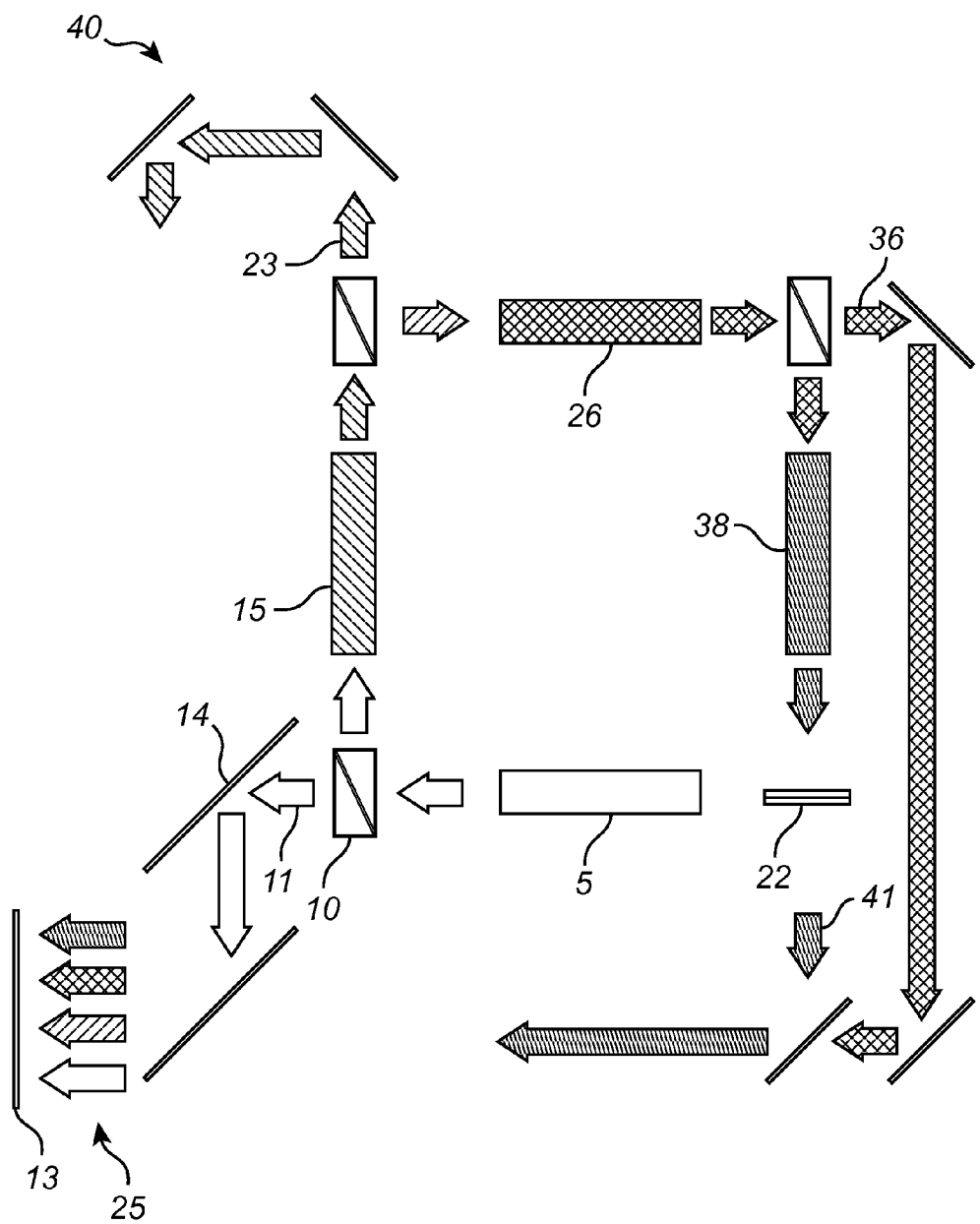
FIG. 3 shows a schematic side view of an embodiment of a multi-staged lighting device having four light concentrators.

FIG. 3 illustrates schematically an embodiment of a multi-staged lighting device 40. In this embodiment, the multi-staged lighting device 40 has a first, a second, a third and a fourth light concentrator 5, 15, 26, 38 arranged so as to form a loop. The light concentrators of this embodiment are similar to the light concentrators described above with reference to FIGS. 1 and 2. The light concentrators of this embodiment are also similarly operatively connected via polarizing beam splitters 10 as the light concentrators described above with reference to FIGS. 1 and 2. The multi-staged lighting device 40 is configured to generate a polarized multi-colored light beam formed by a first, a third, a fifth and a sixth polarized light beam 11, 23, 36, 41, each one of these polarized light beams 11, 23, 36, 41 forming a color component of the polarized multi-colored light beam 25.

During operation of the multi-staged lighting device 1, 39, 40, light emitted by the first light sources 2 enters the first light concentrator 5 via the light receiving surface 6. Most of the light entering the first light concentrator 5 is absorbed by the first wavelength converter 8 which, as a result, emits unpolarized light having a longer wavelength than the light emitted by the first light sources 2. The first wavelength converter 8 emits unpolarized light in random directions, and some of the emitted light is guided inside the light concentrator 5 by total internal reflection. Stated differently, some of the light emitted by the first wavelength converter 8 is coupled into the first light concentrator 5.

Most of the in-coupled light is coupled out of the first light concentrator 5 via the light output surface 7 and split into a first polarized light beam 11 and a second polarized light beam 12 by a polarizing beam splitter 10. The first and second polarized light beams 11, 12 have different polarizations which depend on the desired polarization of the polarized multi-colored light beam 25. The first and second polarized light beams 11, 12 may for example be circularly polarized in opposite directions or linearly polarized perpendicular to each other.

The first polarized light beam 11 is transmitted to form a color component of the multi-colored light beam 25, and the second polarized light beam 12 is transmitted to a second light concentrator 15. The first polarized light beam is thus tapped by means of the polarizing beam splitter 10, and the second polarized light beam 12 is used for pumping the second light concentrator 15. The second polarized light beam 12 enters the second light concentrator 15 via a light input surface 18. Most of the light entering the second light concentrator 15 is absorbed by the second wavelength converter 19. The second wavelength converter 19 also absorbs most of the light that is emitted by the second light sources 17 and that enters the second light concentrator 15. Like with the first wavelength converter 8, the absorption of light by the second wavelength converter 19 results in unpolarized light having a longer wavelength than the absorbed light being emitted in random directions. Some of the emitted light is coupled into the second light concentrator 15 and subsequently out-coupled via a light output surface 20.

The light coupled out of the second light concentrator 15 is polarized by a polarizer 22 into a third polarized light beam 23 which has the same polarization as the first polarized light beam 11 and which is transmitted to a light exit window 13 of the multi-staged lighting device 1, 39, 40 and forms a color component of the polarized multi-colored light beam 25. The polarization of the polarized multi-colored light beam 25 thus equals that of the first and third polarized light beams 11, 23.

Alternatively, light coupled out of the second wavelength converter 15 is split into a third and a fourth polarized light beam 23, 28 by a polarizing beam splitter 27, the third light beam 23 having the same polarization as the first polarized light beam 11 and the polarization of the fourth polarized light beam 28 being opposite that of the third polarized light beam 23. In this case, the third polarized light beam 23 is transmitted to form a color component of the multi-colored light beam 25, and the fourth polarized light beam 28 is transmitted to a third light concentrator 26. That is to say, the third polarized light beam 23 is tapped and the fourth polarized light beam 28 is used for pumping the third light concentrator 26.

The light exiting the third light concentrator 26 can be used for pumping a fourth light concentrator 38, if desired. Clearly, the number of light concentrators included in the multi-staged lighting device 1, 39, 40 may be any number greater than two. By using different numbers of light concentrators pumping each other and tapping polarized light of different colors between the light concentrators, a high-intensity polarized multi-colored light beam 25 having a desired polarization and a desired number of color components can be produced. High-intensity white light may for example be produced by a multi-staged lighting device 1, 39, 40 having a first, a second, and a third light concentrator 5, 15, 26, wherein light emitted by the first, second and third wavelength converters 8, 19, 32 is blue, green and red, respectively. Digital projectors, liquid crystal projectors, spotlights, stage lighting systems and automotive headlamps are a few of the many lighting systems and applications in which the multi-staged lighting device 1, 39, 40 can be used.

The person skilled in the art realizes that the present invention by no means is limited to the preferred embodiments described above. On the contrary, many modifications and variations are possible within the scope of the appended claims. For example, instead of being straight tubes, the light concentrators may be curved tubes or tori.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or an does not exclude a plurality. The mere fact that certain measures are recited in mutually different dependent claims does not indicate that a combination of these measured cannot be used to advantage.

The invention claimed is:

1. A multi-staged lighting device for generating a polarized multi-colored light beam, comprising:
    two or more light concentrators, each light concentrator having a wavelength converter configured to convert light entering the light concentrator to light having a longer wavelength, and
    at least one polarizing beam splitter configured to split converted light coupled out from a light concentrator into two light beams having different polarizations, one of the light beams being transmitted to a different light concentrator and the other light beam forming a color component of the polarized multi-colored light beam,
    wherein light converted by wavelength converters of different light concentrators has different wavelengths, and wherein the light concentrators are arranged in order of increasing wavelength of the converted light, a first light concentrator being arranged to receive light from at least one light source.

2. The multi-staged lighting device according to claim 1, wherein the at least one light source is a solid state light source.

3. The multi-staged lighting device according to claim 1, wherein the at least one light source is configured to emit blue light, violet light or ultraviolet light.

4. The multi-staged lighting device according to claim 1, wherein the two or more light concentrators are configured to receive light from at least one respective light source.

5. The multi-staged lighting device according to claim 4, wherein all of the light sources emit light having the same color.

6. The multi-staged lighting device according to claim 1, wherein the wavelength converters comprises a luminescent material.

7. The multi-staged lighting device according to claim 6, wherein the luminescent material is a phosphor.

8. The multi-staged lighting device according to claim 1, wherein the wavelength converters comprises several quantum dots.

9. The multi-staged lighting device according to claim 1, wherein the at least one polarizing beam splitter is a linear polarizing beam splitter.

10. The multi-staged lighting device according to claim 1, wherein the at least one polarizing beam splitter is a circular polarizing beam splitter.

11. The multi-staged lighting device according to claim 1, further comprising at least one output optical element for transmitting light from a light concentrator to a polarizing beam splitter.

12. The multi-staged lighting device according to claim 1, further comprising at least one input optical element for transmitting light from a polarizing beam splitter to a light concentrator.

13. The multi-staged lighting device according to claim 1, wherein the at least one polarizing beam splitter is integrated with two consecutive light concentrators.

14. A lighting system comprising the multi-staged lighting device according to claim 1.

15. A method for generating a polarized multi-colored light beam, the method comprising:
    arranging two or more light concentrators in a sequence, each light concentrator having a wavelength converter configured to convert light inside the corresponding light concentrator to a longer wavelength, the light concentrators being arranged in order of increasing wavelength of the converted light;
    receiving light at each light concentrator;
    converting light inside each light concentrator to light having a longer wavelength; coupling out converted light from each light concentrator;
    for each pair of consecutive light concentrators, consisting of an upstream light concentrator and a downstream light concentrator:
    splitting the converted light coupled out from the upstream light concentrator into two light beams having different polarizations;
    providing one of the light beams to the downstream light concentrator; and
    forming a color component of the polarized multi-colored light beam with the other light beam.

* * * * *